United States Patent [19]
Hanvey, Jr.

[11] Patent Number: 6,029,477
[45] Date of Patent: Feb. 29, 2000

[54] SYSTEMS AND PROCESS FOR RECYCLING GLASS FIBER WASTE MATERIAL INTO GLASS FIBER PRODUCT

[75] Inventor: Curtis L. Hanvey, Jr., Boiling Springs, N.C.

[73] Assignee: PPG Industries Ohio, Inc., Cleveland, Ohio

[21] Appl. No.: 09/170,674

[22] Filed: Oct. 13, 1998

Related U.S. Application Data

[62] Division of application No. 08/746,044, Nov. 6, 1996.
[51] Int. Cl.⁷ .................................................. C03B 1/00
[52] U.S. Cl. ................... 65/483; 65/540; 65/482; 501/155; 241/243
[58] Field of Search ........................... 65/540, 482, 483; 501/155; 241/243

[56] References Cited

U.S. PATENT DOCUMENTS

| | | |
|---|---|---|
| 4,071,342 | 1/1978 | Schaefer . |
| 4,145,202 | 3/1979 | Grodin . |
| 5,312,052 | 5/1994 | Dellekamp . |
| 5,772,126 | 6/1998 | Hanvey . |

*Primary Examiner*—John Hoffmann
*Attorney, Agent, or Firm*—Andrew C. Siminerio; Ann Marie Cannoni

[57] ABSTRACT

The present invention provides a system for producing glass fiber product from scrap glass fibers comprising at least one crusher having at least one pair of rotatable rollers which rotate at essentially the same speed, the rollers having intermeshing protuberances for crushing scrap glass fibers passing therebetween; a dryer for drying the crushed glass fibers to form dried glass fibers having a mean average moisture content of less than about one weight percent; and a separating device for separating the crushed glass fibers into (1) a first portion of crushed glass fibers having a mean average length of less than about 5 millimeters and (2) oversize dried waste material.

26 Claims, 8 Drawing Sheets

SYSTEMS AND PROCESS FOR RECYCLING GLASS FIBER WASTE MATERIAL INTO GLASS FIBER PRODUCT

This is a divisional of U.S. patent application Ser. No. 08/746,044, filed Nov. 6, 1996.

FIELD OF THE INVENTION

The present invention relates to recycling waste material from a glass fiberizing process and, more particularly, to processing waste glass fibers for reuse as a fiber glass batch melt ingredient or glass fiber reinforcement for composites.

BACKGROUND OF THE INVENTION

As raw material and waste disposal costs for glass fiber production escalate and environmental concerns regarding waste disposal increase, recycling waste glass fibers provides a cost effective means to decrease such costs and alleviate associated environmental concerns.

In the fiber glass industry, waste glass fibers can be produced in the fiber forming process and in subsequent processing operations, such as in the formation of yarns, fabrics, roving, chopped reinforcement and mat products. Various approaches have been used to process and recycle such waste glass fibers.

U.S. Pat. No. 5,352,258 discloses a process and apparatus which shred scrap glass fibers, dry the shredded glass fibers, remove contaminants such as metallic materials, and feed the shredded glass fibers to a glass melter. The feeder is preferably an auger feeder having a dead space at the end of the auger adjacent the melter. The dead space permits build up of shredded glass fiber material to insulate the metal auger from the heat of the melter, as discussed at column 11, lines 31–35 of the patent. The dead space has a length of around 1 to 12 inches along the longitudinal axis of the auger and before the interior of the melter, as discussed at column 13, lines 5–11.

U.S. Pat. No. 4,145,202 discloses a method for processing waste glass strands which includes the steps of cutting and draining free water from the glass strands, removing metal from the strands, drying and incinerating the strands, sieving the strands and, if the particles are too large, grinding or milling the strands to 60 to 325 mesh range.

U.S. Pat. No. 5,312,052 discloses an apparatus and method for reclaiming fiber reinforcement from cured sheet molding compounded (SMC) waste products including a roller mill assembly in which respective rollers of each roller pair are spaced apart and driven at different speeds. Each of the rollers have identical diameters and has serrations extending across the length of the roller. Each of the serrations has a cross-sectional shape in the form of a pointed tooth, as discussed at column 4, lines 4–9.

Typical grinding and milling operations are energy-intensive, have high maintenance costs and therefore are not economically desirable to include in a recycling process. Also, it is often difficult to pneumatically convey recycled glass fibers. There is a need for a system and process for recycling glass fibers which requires minimal energy input, is efficient, durable, inexpensive, and provides glass fiber material which is conveyable by pneumatic transport, compatible with the glass melt and can be sold as a product to be used to reinforce composites.

SUMMARY OF THE INVENTION

The present invention provides a system for producing glass fiber product from scrap glass fibers, the system comprising: (a) a waste material supply comprising waste material produced by a glass fiberizing process and comprising scrap glass fibers which are essentially free of a coating composition; (b) a first crusher positioned to receive scrap glass fibers from the waste material supply, the first crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form crushed glass fibers; (c) a dryer positioned to receive the crushed glass fibers from the first crusher, the dryer for drying the crushed glass fibers to form dried glass fibers having a mean average moisture content of less than about one weight percent; (d) a second crusher positioned to receive dried glass fibers from the dryer, the second crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form secondary crushed glass fibers; and (e) a separating device positioned to receive the secondary crushed glass fibers from the second crusher, the separating device for separating the secondary crushed glass fibers into (1) a first portion of secondary crushed glass fibers having a mean average length of less than about 5 millimeters and (2) oversize dried waste material.

Also provided by the present invention is a system for producing glass fiber product from scrap glass fibers, the system comprising: (a) a waste material supply comprising waste material produced by a glass fiberizing process and comprising scrap glass fibers which are essentially free of a coating composition; (b) a crusher positioned to receive scrap glass fibers from the waste material supply, the crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form crushed glass fibers; (c) a dryer positioned to receive the crushed glass fibers from the crusher, the dryer for drying the crushed glass fibers to form dried glass fibers having a mean average moisture content of less than about one weight percent; and (d) a separating device positioned to receive the dried glass fibers from the dryer, the separating device for separating the dried glass fibers into (1) a first portion of dried glass fibers having a mean average length of less than about 5 millimeters and (2) oversize dried waste material.

Another aspect of the present invention is a system for producing glass fiber product from scrap glass fibers, the system comprising: (a) a waste material supply comprising waste material produced by a glass fiberizing process and comprising scrap glass fibers which are essentially free of a coating composition; (b) a dryer positioned to receive the waste material from the waste material supply, the dryer for drying the scrap glass fibers to form dried glass fibers having a mean average moisture content of less than about one weight percent; (c) a crusher positioned to receive dried glass fibers from the dryer, the crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing dried glass fibers passing therebetween to form crushed glass fibers; and (d) a separating device positioned to receive the crushed glass fibers from the crusher, the separating device for separating the crushed glass fibers into (1) a first portion of crushed glass fibers having a mean average length of less than about 5 millimeters and (2) oversize dried waste material.

Another aspect of the present invention is a system for controlling application of a coating composition to generally continuous fibers, the system comprising (a) a supply of generally continuous fibers; (b) an applicator for applying a coating composition to the fibers; and (c) a fiber displacing device for controlling application of the coating composition to the fibers, the fiber displacing device comprising a retractable member positioned adjacent to and above the applicator, the retractable member having a retracted position in which the fibers are adjacent the applicator for permitting application of the coating composition to the fibers and an extended position in which the retractable member contacts and displaces the fibers such that the fibers are spaced apart from the applicator to inhibit application of the coating composition to the fibers by the applicator.

Also provided by the present invention is a process for recycling waste material produced by a glass fiberizing process, the waste material comprising scrap glass fibers, the process comprising the steps of: (a) crushing scrap glass fibers in a first crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form crushed glass fibers; (b) drying the crushed glass fibers received from the crusher to form dried glass fibers having a mean average moisture content of less than about one weight percent; (c) crushing the dried glass fibers in a second crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form secondary crushed glass fibers; and (d) separating a first portion of secondary crushed glass fibers having a mean average length of less than about 5 millimeters from oversized dried waste material.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

The systems and processes of the present invention represent an economical, durable and environmentally beneficial advance in glass fiber recycling technology which provides efficient recycling of glass fiber to a glass melting and fiber forming (drawing) operation and/or to provide glass fiber suitable for use as reinforcement. Advantages of the system and process of the present invention include that the resulting glass fiber product can be readily pneumatically transported to facilitate recycling of the product to the glass melter and that the system can easily accommodate waste from other glass fiber forming and processing facilities. Recyclable glass fibers produced using the systems and processes of the present invention surprisingly can have relatively smooth ends and low surface organic levels.

Glass fibers suitable for recycling in the systems and process of the present invention include those formed from any type of fiberizable glass composition known to those skilled in the art, such as "E-glass", "A-glass", "C-glass", "D-glass", "R-glass", "S-glass", and E-glass derivatives that are fluorine-free and/or boron-free. As used herein, the term "fibers" means a plurality of individual glass filaments. As used herein, the term "fiberizable" means a material capable of being formed into a generally continuous filament, fiber, strand or yarn. The preferred glass fibers to be recycled using the system and process of the present invention are E-glass fibers.

Such compositions and methods of making glass fibers therefrom are well known to those skilled in the art and will be discussed in greater detail below. If additional information is needed, such glass compositions and fiberization methods are disclosed in K. Loewenstein, *The Manufacturing Technology of Glass Fibres*, (3d Ed. 1993) at pages 30–44, 47–60, 115–122 and 126–135, which are hereby incorporated by reference.

The waste material preferably includes glass fibers of the same composition as the glass melt. For example, it is preferred to use waste material containing E-glass fibers as a recycle material for an E-glass melt. However, glass fibers of different compositions can be used if any imbalance in components is compensated for by adjusting the proportions of the non-vitrified batch materials and adding any other components as necessary.

The nominal filament diameters of suitable scrap glass fibers can range from about 3.5 micrometers (filament designation B) to about 24 micrometers (filament designation U) or larger. Other suitable nominal filament diameters are disclosed in *Loewenstein* at page 25, which is hereby incorporated by reference.

Figure 1:
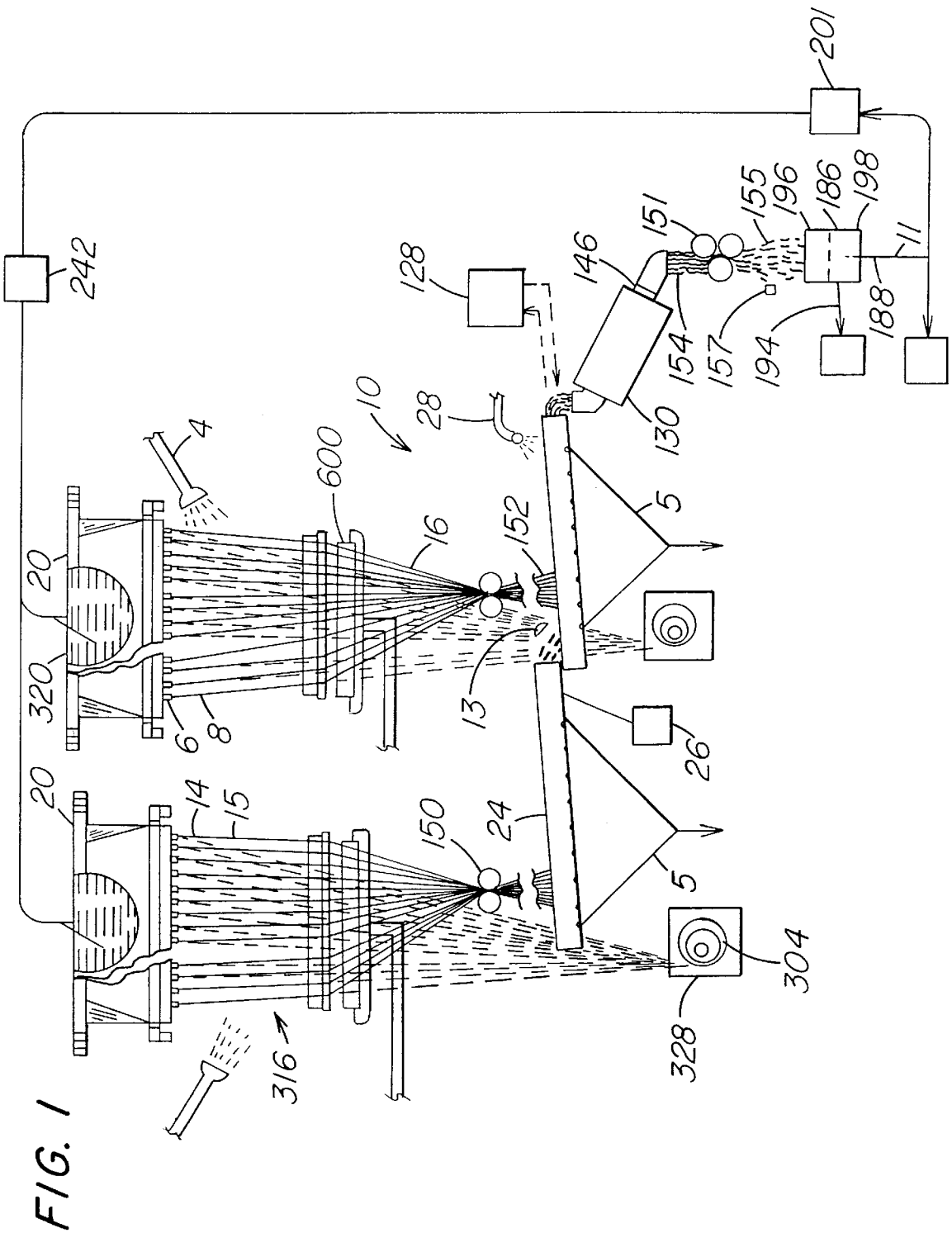
FIG. 1 is a schematic diagram of a system for producing glass fiber product from scrap glass fibers, in accordance with the present invention.

In the manufacture and processing of glass fibers, several different types of waste or scrap glass materials suitable for recycling are generated. Referring to FIG. 1, the waste material supply 14 is preferably obtained directly from a glass fiberizing operation, indicated generally as 316, by collecting waste material 15 emanating from the bushings 6 of the glass melter 20 when the winding process is not in operation. The waste material 15 can be collected continuously as shown in FIG. 1 or batchwise as waste material 15 is accumulated.

Referring to FIG. 1, useful scrap glass fibers 16 for recycling include those which are gathered together by a first crusher 150 or pull roll during the glass fiber forming process, for example when a winding operation is not in progress. When coated with a sizing composition, such scrap glass fibers 16 tend to clump into bundles having a mean average diameter ranging from about 0.001 to about 0.025 meters. It has unexpectedly been discovered that when such glass fibers 16 which are essentially free of any coating composition other than water are passed through the first crusher 150 and/or second crusher 151 discussed below, the glass fibers 16 are broken into lengths 13 ranging from about 0.0125 to about 0.075 meters rather than clumping together into a single, elongated bundle having a length ranging from about 0.025 to about 200 meters, as is typical when a coating composition is applied to the glass fibers prior to passage through the pull roll.

Preferably the surfaces of the glass fibers 16 are essentially free of any coating compositions. Such coating compositions are typically applied by a sizing applicator in a manner discussed below. Although the glass fibers are preferably washed prior to shredding, a portion of the sizing composition can remain on the surfaces of the glass fibers 16. As used herein, "essentially free of any coating compositions" means that the glass fibers 16 preferably have less than about 1 weight percent, and more preferably less than about 0.5 weight percent, of a coating upon the surfaces thereof. Most preferably the surfaces of the glass fibers 16 are free of any coating compositions.

Examples of such coating compositions include sizing compositions and secondary coating compositions. As used herein, the terms "size", "sized" or "sizing" refer to the aqueous coating composition applied to the filaments immediately after formation of the glass fibers. The term "secondary coating" refers to a coating composition applied secondarily to one or a plurality of strands after the sizing composition is applied, and preferably at least partially dried.

Such sizing compositions can include film-formers such as starches, thermoplastic materials and/or thermosetting materials and coupling agents as components. Examples of such sizing compositions are set forth in *Loewenstein* at pages 237–287 and U.S. Pat. Nos. 4,390,647, 4,681,802 and 4,795,678, each of which is hereby incorporated by reference.

Examples of thermoplastic and thermosetting film-forming materials include acrylic polymers, aminoplasts, alkyds, polyepoxides, phenolics, polyamides, polyolefins, polyesters, polyurethanes and vinyl polymers.

Examples of conventional coupling agents for glass fibers include organo silane coupling agents, transition metal coupling agents, phosphonate coupling agents and amino-containing Werner coupling agents.

The waste materials 15 are preferably essentially free of non-glass materials such as cured matrix materials from reinforced composites and non-glass materials which are typically discarded during a glass fiber forming operation, such as cardboard forming tubes, graphite gathering shoes, refractory materials from the glass melting furnace such as chrome oxide, zircon and mullite, steel knives which are used to sever the strand during forming and chunks of hardened sizing composition. As used herein, the phrase "essentially free of non-glass materials" means that the waste materials utilized in the present invention preferably comprise less than about 5 weight percent and more preferably less than about 1 weigh percent of non-glass materials on a total solids basis.

Referring to the drawings, wherein like numerals indicate like elements throughout, there is shown in FIG. 1 a system, generally designated 10, for producing glass fiber product 11 from waste material 15 produced by a glass fiber forming process 316.

The system 6 comprises one or more scrap glass fiber supplies 8 of waste material 15 comprising scrap glass fibers 16. While the scrap glass fibers 16 can be supplied from a variety of sources, preferably the scrap glass fibers 16 are obtained directly from the glass fiber forming process 316, as discussed above.

The waste material 15 entering the system 10 preferably has a dimension 13, such as length or width, which is less than about 0.25 meters (about 10 inch) and more preferably ranges from about 0.013 to about 0.038 meters (about 0.5 to about 1.5 inches). The amount of waste material 15 which can be processed by the system 10 can be about 0.2 to about 10 metric tons per hour (about 500 to about 22,000 pounds per hour, and is preferably about 3 to about 7 metric tons per hour (about 6500 to about 15,000 pounds per hour). The moisture content of the waste material 15 can range from about 1 to about 50 weight percent on a total weight basis.

As shown in FIG. 1, the system 10 comprises one or more first crushers 150, such as a pull roll device, positioned to receive waste material 15 from the scrap glass fiber supply 8 and crush the scrap glass fibers 16 in the waste material 15 to form crushed glass fibers 152.

Referring now to FIGS. 6–9, the crusher 150 comprises at least one pair of rotatable, intermeshing rollers 154 and one or more drive devices 156 for rotating at least one of the rollers 154 such that each pair of rollers 154 rotate at essentially the same speed, and preferably the same speed. As used herein, "essentially the same speed" means that that each of the rollers 154 of a pair rotate within about 5 percent of the speed of the other roll of the pair, and preferably less than about 1 percent.

Preferably the rollers 154 are configured to reduce shearing effects upon the fibers to provide fibers having generally smooth ends.

Figure 6:
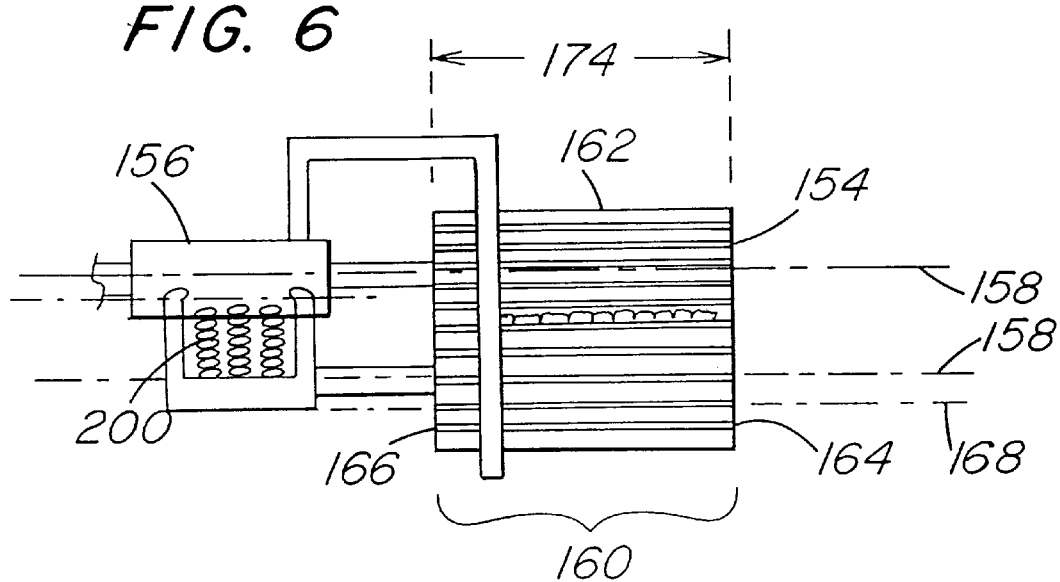
FIG. 6 is a top plan view of a roller crusher which is useful in the present system, in accordance with the present invention.
Figure 7:
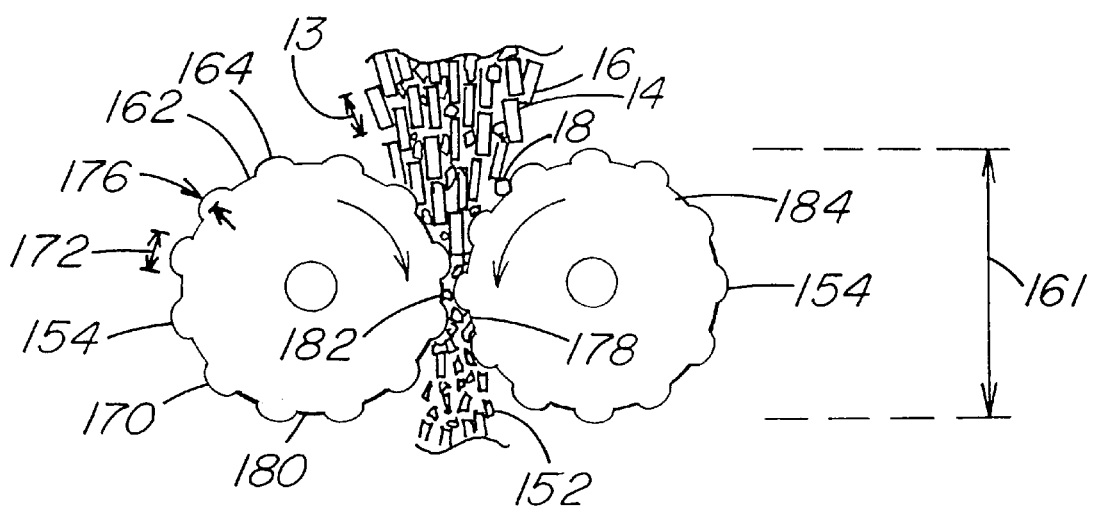
FIG. 7 is an end view of the pair of rollers of the roller crusher of FIG. 6, in accordance with the present invention.
Figure 8:
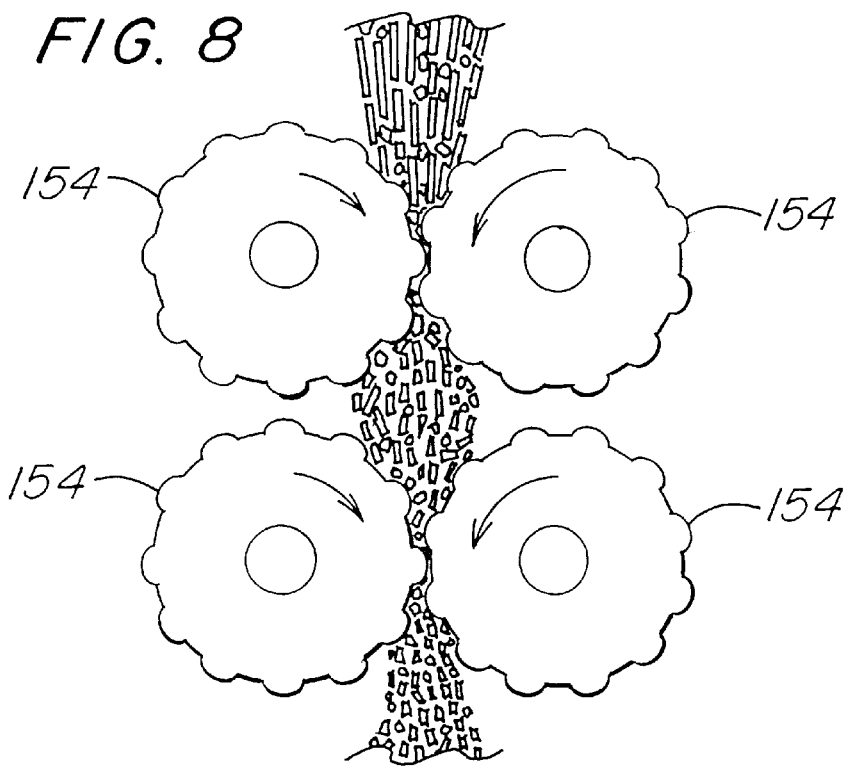
FIG. 8 is an end view of a plurality of rollers of a roller crusher which is useful in the present system, in accordance with the present invention.
Figure 9:
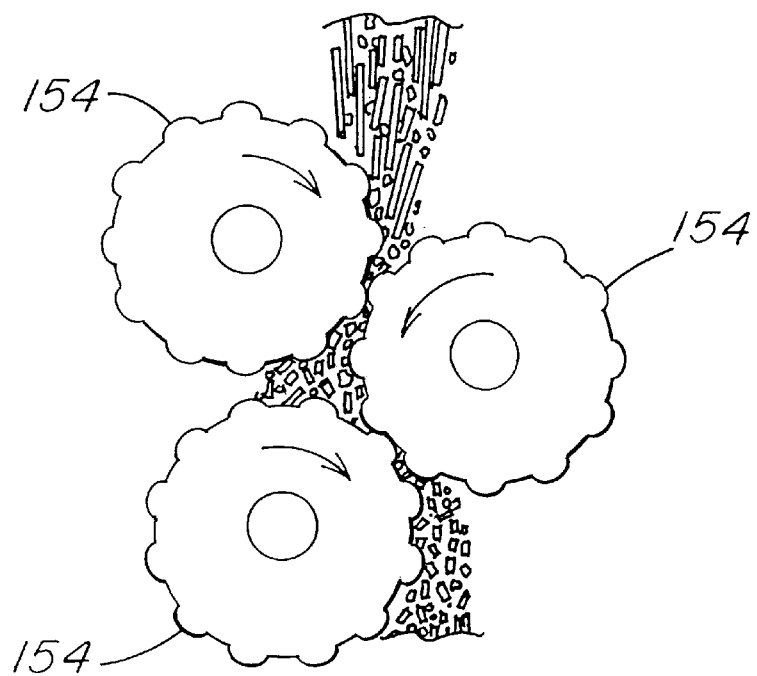
FIG. 9 is an end view of a preferred configuration of a plurality of rollers of a roller crusher which is useful in the present system, in accordance with the present invention.

As shown in FIGS. 6–9, the crusher 150 can comprise a plurality of pairs of intermeshing rollers 154. Preferably the crusher 150 comprises a single pair of rollers 154. Each of the rollers 154 has an axis of rotation 158, the axes of rotation 158 of each pair of rollers 154 preferably being parallel and horizontally aligned as shown in FIGS. 6–8. In an alternative embodiment, the axes of rotation 158 of each pair of rollers 154 are generally parallel and vertically offset, as shown in FIG. 9.

Preferably, the rollers 154 are formed from a material selected from the group consisting of resilient thermoplastic materials and thermosetting materials, preferably a urethane polymer. Although not preferred, the rollers 154 can be formed from a metallic material such as steel, if desired.

The length 160 of each roller 154 can range from about 0.1 to about 0.75 meters (about 4 to about 30 inches) and preferably about 0.1 to about 0.2 meters (about 4 to about 8 inches). The diameter 161 of each roller 154 can range from about 0.1 to about 0.5 meters (about 4 to about 20 inches) and preferably about 0.1 to about 0.2 meters (about 4 to about 8 inches). The length 160 and diameter 161 of each roller 154 of a pair of rollers can be different, if desired.

Each roller 154 has an outer surface 162 comprising a plurality of protuberances 164 which are preferably essentially free of serrations. As used herein, "essentially free of serrations" means that the outer surface 162 of each roller 154 has less than about 5 percent by surface area, and is preferably free of, serrations having a cross-sectional shape in the form of a pointed tooth. Preferably the rollers 154 of a pair of rollers 154 have about the same pitch. Preferably, the protuberance 164 is a ridge or corrugation 166 having a longitudinal axis 168 which is generally parallel to the axis of rotation 158 of the roller 154, the edges 170 of the corrugation 166 preferably being generally rounded.

The width 172 of the corrugation 166 can range from about 0.0016 to about 0.025 meters (about ¹⁄₁₆ to about 1 inches), and is preferably about 0.003 to about 0.006 meters (about ⅛ to about ¼ inches). The length 174 of the corrugation 166 is preferably about the same as the length 160 of the roller 154. One or more ridges 166 can be positioned along the length 160 of the roller 154, as desired. The height 176 of the corrugation 166 is preferably greater than or equal to the width 172 of the corrugation and can range from about 0.0016 to about 0.025 meters (about ¹⁄₁₆ to about 1 inches). The height 176 of the corrugation 166 can vary along the length 160 of the roller 154, as desired. Alternatively, a knurled roll can be used.

At least a portion 178 of a protuberance 164 of a first roller 180 of the pair of rollers 154 contacts a corresponding mating portion 182 of at least one protuberance 164 of a second roller 184 of the pair of rollers 154 for crushing scrap glass fibers 16 passing therebetween to form crushed glass fibers 152. One or more biasing members 200, such as springs or hydraulic cylinders, are used to bias the rollers 180, 184 into contact. Non-limiting examples of suitable air cylinders for biasing the rollers 180, 184 into contact are spring-loaded hydraulic cylinders which are commercially available from Bimba Inc. of Monel, Ill. The biasing force provided by the biasing member 200 should be sufficient to maintain the rollers 180, 184 in contact when crushing glass fibers, but should permit the rollers 180, 184 to separate to permit uncrushable materials such as refractory materials to pass therethrough.

Referring now to FIG. 1, the system 10 preferably further comprises one or more conveyors 24 positioned between any of the system components for conveying the waste material 15 through the system 10.

Preferably, the conveyor 24 is sufficiently wide and thick to stably accommodate the waste material 15 on the conveyor 24 and to prevent the waste material 15 from spilling from the conveyor 24 during transport. The width of the conveyor 24 can be about 0.3 to about 1.5 meters. The preferred conveyor 24 is about 1.3 meters (about 54 inches) wide. The length of the conveyor 24 can be any length suitable to convey the waste material 15 between components of the system 10. The thickness of the conveyor 24 can be about 0.005 to about 0.025 meters and can vary based upon such factors as the material from which the conveyor is formed, dimensions and weight of the waste material 15 to be transported.

Non-limiting examples of suitable conveyors 24 include vibratory conveyors, belt conveyors, screw conveyors, horizontal conveyors, and batch conveyors which transport a plurality of individual containers, each container holding a portion of waste material 15. The preferred conveyor 24 for use in the present invention has a double V-shaped trough which can be perforated to permit drainage of moisture 5, such as is commercially available from General Kinematics of Barrington, Ill. Screw and horizontal conveyors are also preferred for use in the present invention. Suitable screw conveyors are commercially available from Thomas Conveyor Co. of Fort Worth, Tex.

The conveyor 24 can be inclined with respect to horizontal to facilitate drainage of the waste material 15. Preferably, the conveyor 24 is inclined at about a 5 to about a 20 degree angle with respect to horizontal, and more preferably about 15 degrees.

The conveyor 24 comprises a drive device 26, such as an eccentric direct drive motor. Preferably, the motor is a conventional AC eccentric direct drive motor of about 5 to about 50 horsepower. One skilled in the art would understand that any suitable motor and drive capable of providing power to move the waste material 15 from a first position to a second position spaced apart from the first position would be useful in the present invention. The conveyor 24 is preferably moved at a speed of about 4.5 to about 30 meters/minute, and more preferably about 12 meters/minute.

One skilled in the art would understand that one or a plurality of conveyors 24 can be used in the waste material processing system 10. Also, the conveyor 24 can be enclosed and/or heated, if desired.

Alternatively, some or all of the system components can be positioned such that the waste material 15 being discharged from a given component enters the inlet of the next component of the system 10 without intervening conveyors 24.

The system 10 can further comprise one or more applicators 28 positioned between the first crusher 150 and the dryer 130 for applying less than about 0.1 weight percent of a lubricant to the waste material 15 prior to passage through the dryer 130. Non-limiting examples of lubricants include conventional glass fiber lubricants such as amine salts of fatty acids, alkyl imidazoline derivatives, acid solubilized fatty acid amides, acid solubilized polyunsaturated fatty acid amides, condensates of a fatty acid and polyethylene imine and amide-substituted polyethylene imines. Other useful lubricants are disclosed in *Loewenstein* at pages 264–266, which are hereby incorporated by reference.

The system 10 can further comprise a metal detector and removal device 128 positioned between the crusher 150 and the dryer 130 for removing contaminants such as metallic material and graphite from the moisture-reduced waste material. Suitable metal detector and removal systems are well known to those skilled in the art and include metal detectors which determine the presence of metallic materials by fluctuations in the spatial location and amplitude in a field of fixed frequency which can be generated using an inductor of fixed inductance and a capacitor of fixed capacitance. A non-limiting example of a suitable metal detector 128 is E-Z Tech Model III synchro magnetic detector, which is commercially available from Eriez Manufacturing Co. of Erie, Pa. The contaminants can be removed or separated from the waste material 15 by a diverter, slot or gate in the conveyor 24 which is opened in response to a signal received from the metal detector 128, for example.

The system 10 comprises one or more dryers 130 positioned to receive the waste material 15 from the crusher 150 (or metal removal device 128, if present). The dryer 130 drys the waste material 15 to form dried waste material 154 having a mean average moisture content of less than about one weight percent, and preferably about 0.3 to about 0.5 weight percent moisture on a total weight basis. Preferably the dryer 130 is combined with one or more cooling devices 146 for cooling the dried waste material 154 received from the dryer.

The dryer 130 preferably drys the waste material 15 by exposure to heated air at a temperature ranging from about 120° C. to about 815° C. (about 250° F. to about 1500° F.), and more preferably about 232° C. to about 372° C. about 250° F. to about 390° F.). The time period for drying preferably ranges from about 5 to about 30 minutes, and more preferably about 7 to about 15 minutes. Preferably the dried waste material 154 is cooled to about 25° C. upon exiting the cooler 146.

Suitable dryers 130 can be selected from rotary dryers (preferred), fluidized bed dryers, forced air dryers, infrared dryers, radio frequency dryers, hot air resistance dryers and other suitable direct fired dryers for glass fibers which are well known to those skilled in the art. Non-limiting examples of useful dryers 130 include Rotor-Louvre Precision dryers/coolers which are commercially available from FMC Corporation of Chalfont, Pa. and rotary calciners/coolers which are commercially available from Heyl & Patterson, Inc.

The system 10 can further comprise one or more baghouses (not shown) for separating and recovering fine dried waste material 154 from the air stream received from the dryer 130. Suitable baghouses are well known to those skilled in the art and are commercially available from Nol-Tec Systems, Inc. of Forest Lake, Minn. The fine waste material can be recombined with the dried waste material 154 for further processing.

The system 10 preferably comprises one or more second crushers 151 positioned to receive dried waste material 154 from the dryer 130. The second crusher 151 is preferably a plurality of pairs of rotatable, intermeshing rollers 154 and one or more drive devices 156 configured and operated as discussed above with respect to the first crusher 150. However, it is preferred that the axes of rotation 158 of each pair of rollers 154 are generally offset, as shown in FIG. 9. The second crusher 151 preferably crushes the dried waste material 154 such that the secondary crushed glass fibers 155 therein have a mean average dimension 157, such as width or length, of less than about 5 millimeters (about $3/16$ inches), and preferably between about 0.0008 and about 0.003 millimeters (about $1/32$ to about $1/8$ inches).

As shown in FIG. 1, the system 10 comprises one or more separating devices 186 positioned to receive the dried glass fibers 154 or the secondary crushed glass fibers 155 from the crusher 151, if present. The separating device 186 separates the dried glass fibers 154 or crushed glass fibers 155 into a first portion 188 having a mean average dimension 11, i.e., length and width, of less than about 5 millimeters (about $3/16$ inches), and preferably between about 0.0008 and about 0.003 millimeters (about $1/32$ to about $1/8$ inches) from oversize waste material 194 which can be discarded or recycled through the system 10, if desired. Typically, the first portion 188 comprises about 80 to about 99 weight percent of the waste material 15.

The separating device 186 can be one or more screening devices. The separating device 186 is preferably two screening devices 196 and 198, respectively, such as are shown in FIG. 1. Preferably the screening devices 196, 198 do not lift the dried glass fibers 154 or crushed glass fibers 155 vertically to prevent oversize waste material 194 from reorienting such that the length of the oversize waste material 194 is generally perpendicular to the plane of the screen which permits oversize waste material 194 to pass through openings 195 in the screen.

Useful screening devices 196, 198 include mechanical shaking screens and vibrating screens such as are discussed above. The preferred screening devices 196, 198 are scalping vibratory screeners such as Series 80 screeners with a DX 2000 drive which are commercially available from Rotex. The first screening device 196 preferably has about 0.005 to about 0.02 meters (about $3/16$ to about $3/4$ inch), and more preferably about 0.006 meters ($1/4$ inch) opening wire cloth screen and the second screening device 198 preferably has about 0.0008 to about 0.005 meters (about $1/32$ to about $3/16$ inch), and more preferably about 0.003 meters ($1/8$ inch) opening perforated plate when the screened material is to be pneumatically conveyed. The openings can be slightly larger, i.e., about 0.006 meters ($1/4$ inch) if the material is to be mechanically conveyed.

Alternatively, the separating device 186 can be one or more air separating devices 202, 500 (shown in FIGS. 10 and 11, respectively) positioned to receive the dried glass fibers 154 from the dryer 130 (or crushed glass fibers 155 from the second crusher 151, if present).

Figure 10:
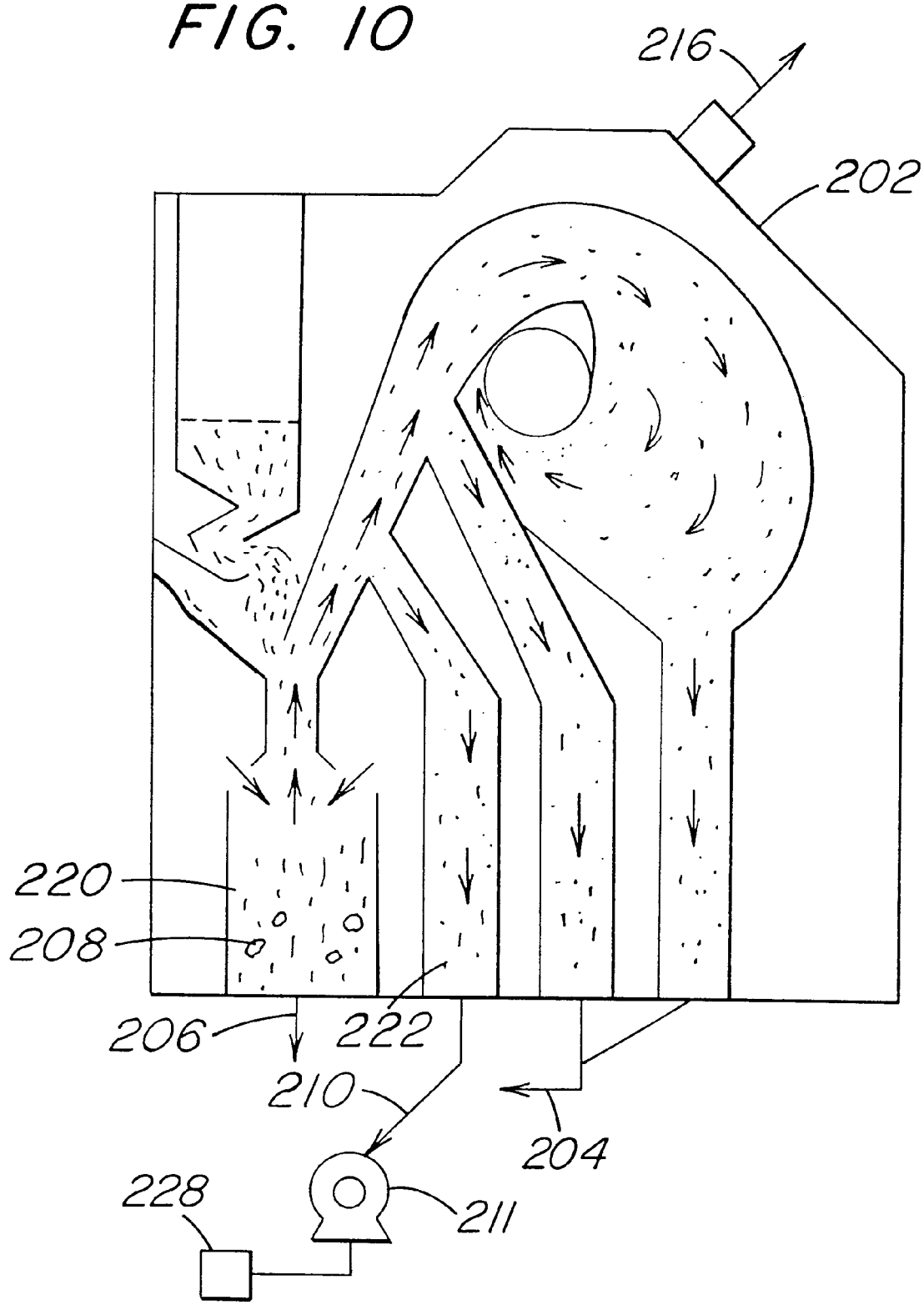
FIG. 10 is a schematic diagram of an air separating device which is useful in the present system, in accordance with the present invention.
Figure 11:
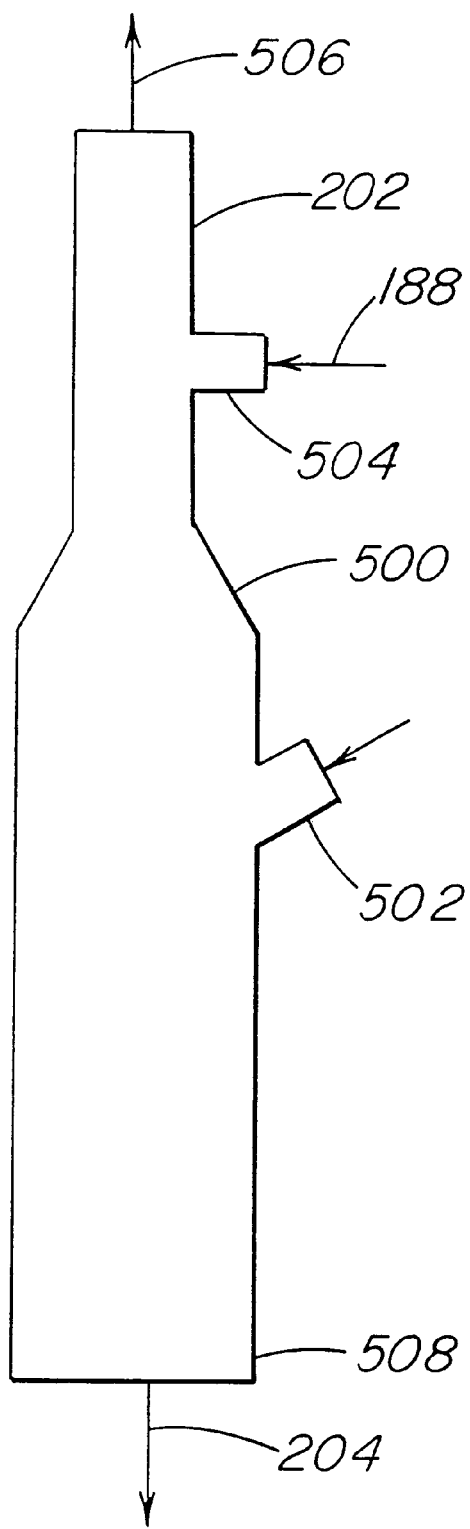
FIG. 11 is a schematic diagram of an alternative embodiment of an air separating device which is useful in the present system, in accordance with the present invention.

Referring to FIG. 10, the air separating device 202 separates a first portion 204 of dried glass fibers 154 or crushed glass fibers 155 having a mean average length of less than about 5 millimeters (about $3/16$ inches), and preferably between about 0.0008 and about 0.003 millimeters (about $1/32$ to about $1/8$ inches) from a second portion 206 of oversize glass fibers and other waste material. The portion 204 is preferably sized such that it can be pneumatically transferred to a storage bin by a pneumatic air transport. The fines 214 entrained in the air stream can be recovered by passing the air stream through a baghouse, examples of which are discussed above.

The separation of the different fractions of waste material depend upon such factors as the air velocity, particle size, configuration, weight and inertia. By varying the air velocity, configuration and number of separation chambers or separating devices, the grouping of desired fractions can be achieved. Preferably, the air velocity within an uplift air separating device 202, 500 can be about 0.6 to about 60 meters per second (about 2 to about 200 feet per second), and is preferably about 6 to about 48 meters per second (about 20 to about 160 feet per second) and more preferably about 39 to about 45 meters per second (about 130 to about 150 feet per second).

The air separating device 202 is preferably an uplift air separator, such as is shown generally in FIG. 10. Examples of suitable uplift air separators are Models CEX2 and CEY2 fractionating aspirators which are commercially available from Carter Day of Minneapolis, Minn. The attached blower can be powered by any conventional motor such as are discussed above, for example a 5 horsepower motor such as are commercially available from Baldor. The CEY2 air separator has a 1.2 meter (48 inch) wide air/material contact width and three product collection chambers which permit collection of several fractions of product. See "Carter Day Fractionating Aspirator 24" & 48 "Instruction Manual", Carter Day (Minneapolis, Minn.).

Referring to FIG. 10, preferably the first collection chamber 220 separates and accumulates dried waste material 208, such as cardboard forming package tubes, which is larger than about 16 mesh, and more preferably about 20 mesh. This waste material 208 is preferably discarded.

The second collection chamber 222 separates and accumulates dried waste material which ranges from about 16 to about 65 mesh, and more preferably about 20 to about 60 mesh. This oversize waste material 210 can be treated with a lubricant such as water and passed through a mill or pulverizer 211 and a second air separating device 228.

Non-limiting examples of suitable pulverizers include ring roller mills, hammer mills, grinding mills, rotary mills, ball mills, vibratory mills and pin mills such as are disclosed in the *Chemical Engineers' Handbook* at pages 8–33 through 8–40, which are hereby incorporated by reference. Non-limiting examples of suitable pulverizers include the SIMPACTOR® rotary mills which are commercially available from Sturtvant of Boston, Mass. and the Buffalo WA Series vibratory mills which are commercially available from Hammer Mill Corp. Of Buffalo, N.Y. If a pulverizer 211 is include in the system 10, it is preferred that it pulverize the waste material to have a mean average length of less than about 20 mesh, and preferably between about 20 mesh and about 60 mesh.

One skilled in the art would understand that the number of collection chambers can be varied as desired, and the portion of waste material being diverted to a particular chamber can be influenced by such factors as the air velocity within and the configuration of the air separating device 202.

Alternatively, the air separating device 202 can be a series of cyclone separators or tapered pipes (shown in FIG. 14), each pipe 500 having a first side entry inlet 504 for regulating air, a main air bottom inlet 510 and a second side entry inlet 502 below the air inlet 504 for receiving the first portion 188 of dried waste material from the separating device 186. The light fraction is entrained by the airstream and exits the top 506 of the pipe 500 and the portion 204 of crushed glass fibers exits from the bottom 508 of the pipe 500. Other useful air separating devices or air classifiers are disclosed in the *Chemical Engineers' Handbook* at pages 8–31 through 8–32, which are hereby incorporated by reference.

The preferred system 10 can further comprise one or more pneumatic transports 201. The pneumatic transport 201 is preferably a batch-loaded, dense phase transport system capable of transporting loads of about 0.5 metric tons (about 1000 pounds) such as are commercially available from Nol-Tec Systems, Inc. and Dynamic Air of St. Paul, Minn. and as are disclosed in *Loewenstein* at pages 45–46, which are hereby incorporated by reference.

Uses for the recyclable glass fiber product produced according to the system and process of the present invention will now be discussed. The glass fibers from the recycle process can be mixed with batch materials in a blender and fed by a feeder 242 to the glass melter 20 or directly to the glass melter 20 as a separate batch ingredient. The blender can be a conventional mixer for glass fibers which are well known to those skilled in the art, such as are commercially available from Nol-Tec Systems, Inc. and as are disclosed in *Loewenstein* at pages 45–46. Suitable feeders 242 for glass fibers include loss-in-weight feeders and the auger feeder disclosed in U.S. Pat. No. 5,352,258 at column 6, line 64 through column 7, line 25 and column 11, lines 5–38, which are hereby incorporated by reference. Other suitable feeders are well known to those skilled in the art.

Alternatively, the crushed glass fibers can be fed to another glass melter which operates on 100 percent recycled scrap glass.

In a typical glass fiber forming operation, particulate batch materials of from less than about 325 to about 100 mesh (U.S. sieve series) are mixed, melted in a glass furnace or melter 20 and drawn into glass fibers.

The glass melter 20, also referred to as a glass furnace or forehearth, contains a supply of molten glass 320 and has a precious metal bushing 6 or spinneret attached to the bottom of the glass melter 20. The bushing 6 is provided with a series of orifices in the form of tips through which molten glass 320 is drawn in the form of individual fibers 16 or filaments at a high rate of speed.

The glass fibers 16 can be cooled by spraying with water 4 and then coated with a sizing composition by an applicator 600 which contacts the fibers 318 prior to entering the alignment device 326. Examples of suitable applicators are shown in FIGS. 1–3 and 5 and are disclosed in *Loewenstein* at pages 165–172, which are hereby incorporated by reference.

Figure 3:
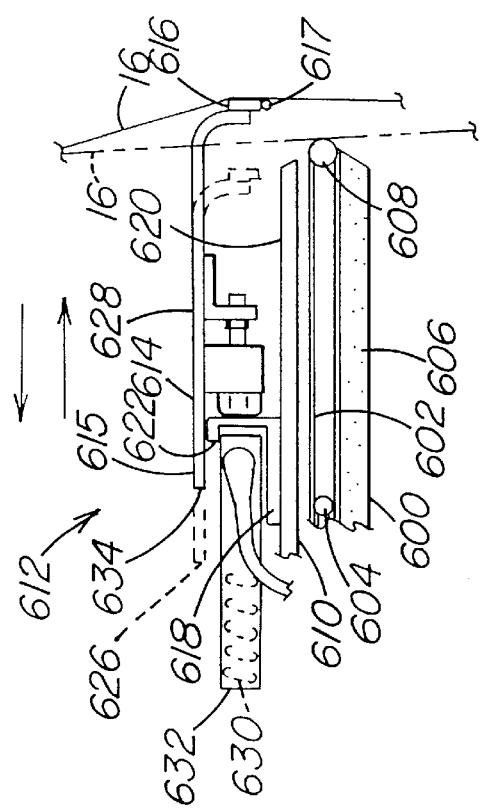
FIG. 3 is a side elevational view of the fiber displacing device and the coating composition applicator of FIG. 2, in accordance with the present invention.
Figure 5:
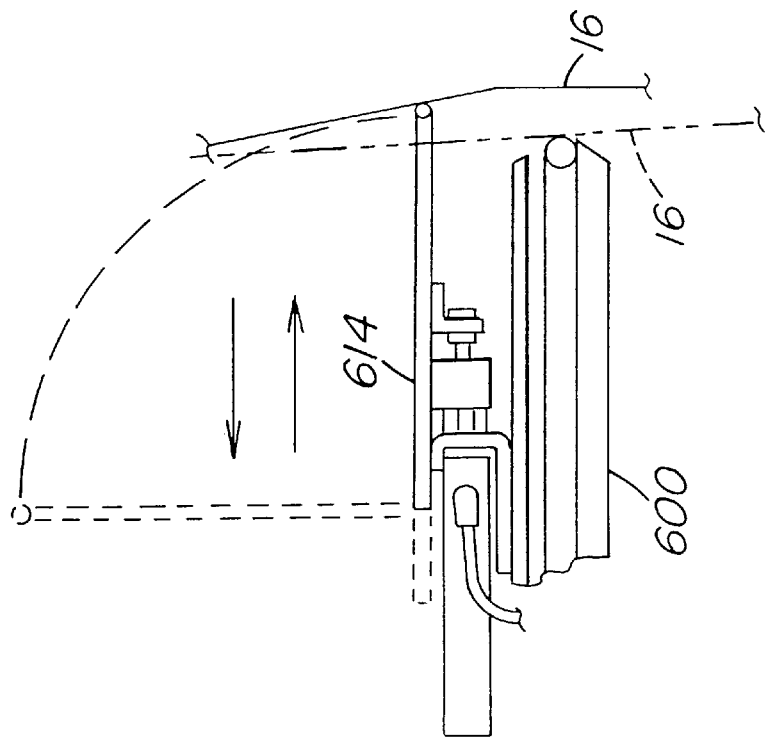
FIG. 5 is a side elevational view of an alternative embodiment of a fiber displacing device, in accordance with the present invention.

Referring now to FIG. 3, the preferred applicator 600 includes a belt 602 which passes over a driven roller 604 which dips the belt 602 into a supply 606 of coating composition. The belt 602 also passes over a fixed member, such as a bar 608, at which position the glass fibers 16 (shown in phantom) are coated with the coating composition. Typically, the applicator 600 also includes a lid 610 for minimizing contamination of the coating composition.

Another aspect of the present invention is a system, indicated generally at 612, for controlling application of a coating composition to generally continuous fibers 16. While the system 612 will be discussed below with reference to glass fibers 16, it will be understood by one skilled in the art that the system 612 can be used for controlling application of a coating composition to any generally continuous fibers. Fibers believed to be useful in the present invention, such as natural or man-made materials, are discussed at length in the *Encyclopedia of Polymer Science and Technology*, Vol. 6 (1967) at pages 505–712, which is hereby incorporated by reference.

Suitable natural materials include those derived directly from animal, vegetable and mineral sources, such as cotton, cellulose, natural rubber, flax, ramie, hemp, sisal, wool, mineral wool and basalt. Man-made fibers can also be based upon synthetic polymers such as polyamides, polyesters, acrylics, polyolefins, polyurethanes, vinyl polymers, derivatives and mixtures thereof. *Encyclopedia of Polymer Science and Technology*, Vol. 6 at 506.

Referring now to FIG. 1, the system 612 comprises a supply 8 of generally continuous fibers 16, preferably glass fibers such as are discussed in detail above.

The system 612 comprises an applicator 600, discussed in detail above, for applying a coating composition to the glass fibers 16. The coating composition can be applied to the glass fibers at any rate desired, which will be influenced by such factors as the desired amount of coating to be applied to the glass fibers 16 and the configuration of the applicator 600.

The system 612 comprises a fiber displacing device 614 for controlling application of the coating composition to the glass fibers 16. The fiber displacing device 614 comprises a body 615 for supporting a retractable member 616 positioned adjacent to and above the applicator 600, and which is preferably connected to the lid 610 of the applicator 600. The dimensions of the body 615 are preferably sufficient to protect the devices for moving the retractable member 616 from sling-off or spillage of the coating composition and the water sprays overhead.

Figure 4:
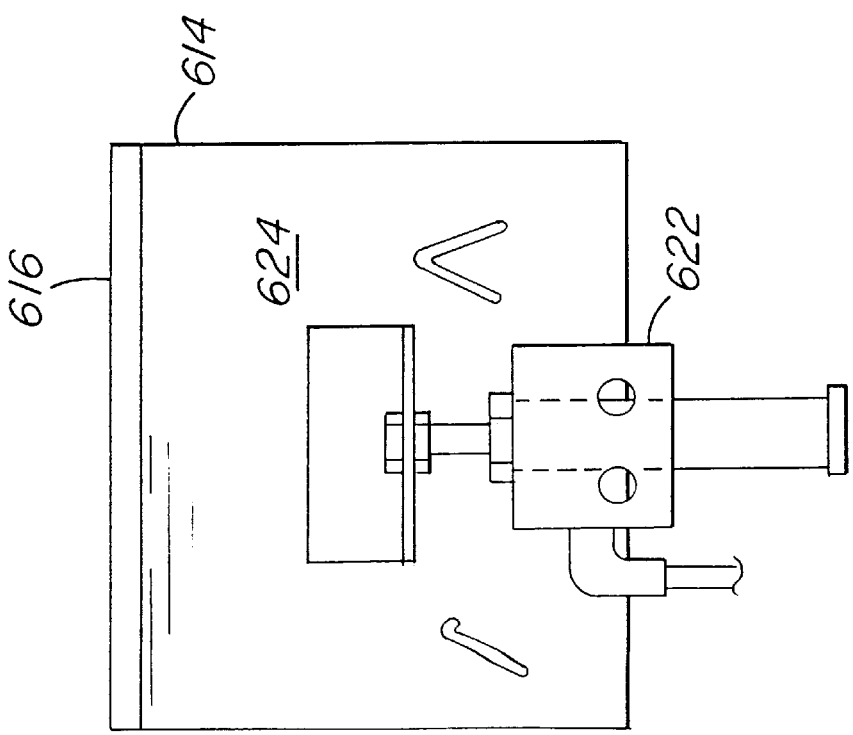
FIG. 4 is a bottom elevational view of the fiber displacing device, in accordance with the present invention.

The retractable member 616 can be connected to the lid 610 by a securing device, such as by a screw and threaded aperture, nut and bolt or preferably by welding a flange 618 on the surface 620 of the lid 610 to a corresponding flange 622 on the bottom 624 of the fiber displacing device 614, best shown in FIG. 4.

Figure 2:
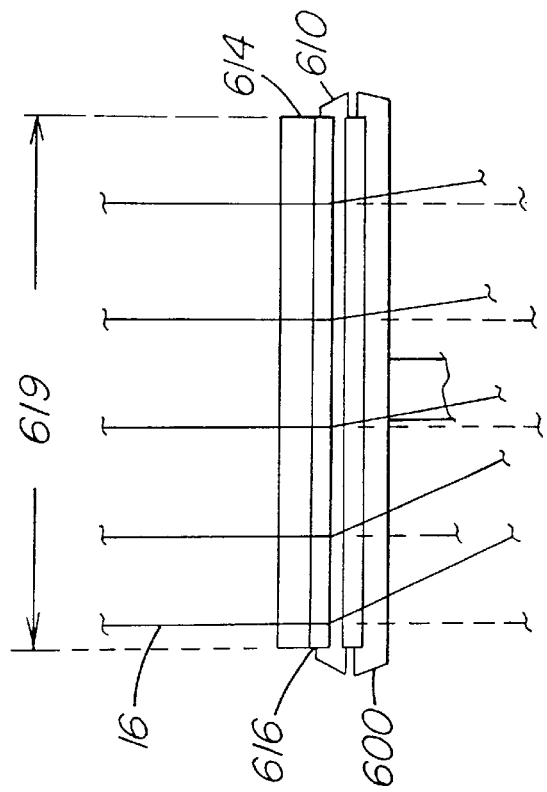
FIG. 2 is a front elevational view of a fiber displacing device and a coating composition applicator, in accordance with the present invention.

The retractable member 616 can be formed from a metallic material such as brass and/or graphite. Referring to FIG. 2, the length 617 of the retractable member 616 can be any length sufficient to displace the fan of glass fibers 16 from contact with the applicator 600, and can range from about 0.025 to about 0.9 meters. Referring to FIG. 3, the width 619 of the retractable member 616 can range from about 0.025 to about 0.9 meters. The height 621 of the retractable member 616 can range from about 0.003 to about 0.075 meters. One skilled in the art would understand that the retractable member 616 can have any shape in cross-section desired, such as rectangular (shown in FIG. 3) or circular.

As shown in FIG. 3, the retractable member 616 has a retracted position 626 in which the glass fibers 16 are adjacent the applicator belt 602 for permitting application of the coating composition to the glass fibers 16. The retractable member 616 has an extended position 628 in which the retractable member 616 contacts and displaces the glass fibers 16 such that the glass fibers 16 are spaced apart from the applicator 600 and belt 602 to inhibit application of the coating composition to the glass fibers 16 by the applicator 600.

The retractable member 616 can be biased in the extended position 628 by a spring 630 (shown in phantom in FIG. 3) or other biasing member, such as a pneumatic or hydraulic cylinder. Alternatively, the retractable member 616 can be biased in the retracted position 626, if desired.

The retractable member 616 can be moved between the extended position 628 and the retracted position 626 by using a piston and cylinder arrangement 632, such as a pneumatic or hydraulic cylinder. A non-limiting example of a suitable pneumatic cylinder having an internal spring is Model No. BF-041 which is commercially available from Bimba, Inc. of Monel, Ill. The pressure needed to move the retractable member 616 between the extended position 628 and the retracted position 626 can vary based upon such factors as the weight of the retractable member 616 and the distance 634 between the extended position 628 and the retracted position 626. For example, for a stainless steel retractable member 616 such as that shown in FIGS. 2–4

Referring to FIG. 1, the fiber forming operation 316 also comprises a winder 328 for receiving the fibers 16 from the alignment device, advancing and applying a tension to the fibers 16, and forming the fibers 16 into a wound forming package 304.

Alternatively, the glass fibers from the above recycle process can be used as reinforcement for composites. The coated strands can be used in a wide variety of applications, such as reinforcements for automobile parts, fishing rods and pultruded or filament wound products, for example.

The reinforcements are used to reinforce polymeric matrix materials, such as polymeric thermoplastic materials and polymeric thermosetting materials. Non-limiting examples of suitable polymeric thermoplastic materials include polyolefins, polyamides, thermoplastic polyurethanes, thermoplastic polyesters, acrylic polymers, vinyl polymers, derivatives and mixtures thereof.

Non-limiting examples of useful polyolefins include polyethylene, extended-chain polyethylene, polypropylene, polybutene, polyisoprene, and polypentene, polymethyl pentene, polytetrafluoroethylene and neoprene.

Useful polyamides include nylons such as nylon 6 (a polymer of caprolactam), nylon 12 (which can be made from butadiene), nylon 66 (a condensation product of adipic acid and hexamethylenediamine), nylon 10 and nylon 12. Useful nylons are commercially available from DuPont. Other examples of useful polyamides include polyhexamethylene adipamide and aramids such as Kevlar™, which is commercially available from E.I. duPont de Nemours and Company of Wilmington, Del.

Suitable thermoplastic polyurethanes are condensation products of a polyisocyanate material and a hydroxyl-containing material such as polyol and include, for example, Estane and Texin polyurethanes which are commercially available from B.F.Goodrich of Toledo, Ohio and Bayer, respectively.

Thermoplastic polyesters useful in the present invention include polyethylene terephthalate and polybutylene terephthalate.

Acrylic polymers useful in the present invention include polyacrylates, polyacrylamides and polyacrylonitriles such as nitrile rubber.

Useful vinyl polymers include polyvinyl chloride, polyvinylidene chloride (saran), polyvinyl fluoride, polyvinylidene fluoride, ethylene vinyl acetate copolymers and polystyrenes.

Thermoplastic elastomeric materials useful as matrix materials in the present invention include styrene-butadiene rubbers, styrene-acrylonitrile (SAN) copolymers, styrene-butadiene-styrene (SBS) copolymers and acrylonitrile-butadiene-styrene (ABS) copolymers.

Further examples of useful thermoplastic materials include polyimides including polyether imides, polyether sulfones, polyphenyl sulfones, polyetherketones including polyetheretherketones (PEEK), polyphenylene oxides, polyphenylene sulfides, polyacetals, polyvinyl chlorides and polycarbonates. Also included as suitable thermoplastic materials are any of the above thermoplastics which are modified by an unsaturated monomer.

Matrix materials useful in the present invention can include thermosetting materials such as thermosetting polyesters, vinyl esters, epoxides, phenolics, aminoplasts, thermosetting polyurethanes, derivatives and mixtures thereof.

Other components which can be included with the polymeric matrix material and reinforcing material in the composite are, for example, colorants or pigments, lubricants or process aids, ultraviolet light (UV) stabilizers, antioxidants, other fillers, and extenders.

The polymeric matrix material can be formed into a composite by a variety of methods which are dependent upon such factors as the type of polymeric matrix material used. Thermosetting polymeric matrix materials can be cured by application of heat. The temperature and curing time for the thermosetting polymeric matrix material depends upon such factors as the type of polymeric matrix material used, other additives in the matrix system and thickness of the composite, to name a few.

The recycled glass fiber reinforcing material can be dispersed in the matrix by hand or any suitable automated feed or mixing device which distributes the reinforcing material generally evenly throughout the polymeric matrix material. For example, the reinforcing material can be dispersed in the polymeric matrix material by dry blending all of the components concurrently or sequentially.

The polymeric matrix material can be at least partially curing to provide a reinforced polymeric composite. Thermosetting polymeric matrix materials can be cured by the inclusion of crosslinkers in the matrix material and/or by the application of heat, for example. Suitable crosslinkers useful to crosslink the polymeric matrix material are discussed above.

Reinforced polymeric composites can be formed from the polymeric matrix material, reinforcing material and any other desired components in a variety of ways. For example, for a thermosetting matrix material, the composite can be formed by compression or injection molding, pultrusion, filament winding, hand lay-up, spray-up or by sheet molding or bulk molding followed by compression or injection molding. For a thermoplastic matrix material, suitable methods for forming the composite include direct molding or extrusion compounding followed by injection molding. Useful extrusion equipment includes single or twin screw extruders commercially available from Werner Pfleiderer and Welding Engineers, respectively. Methods and apparatus for forming the composite by the above methods is discussed in "Handbook of Plastic Materials and Technology" at pages 955–1062, 1179–1215 and 1225–1271, which are hereby incorporated by reference.

The process according to the present invention for processing waste material for recycling will now be described generally.

Figure 12:
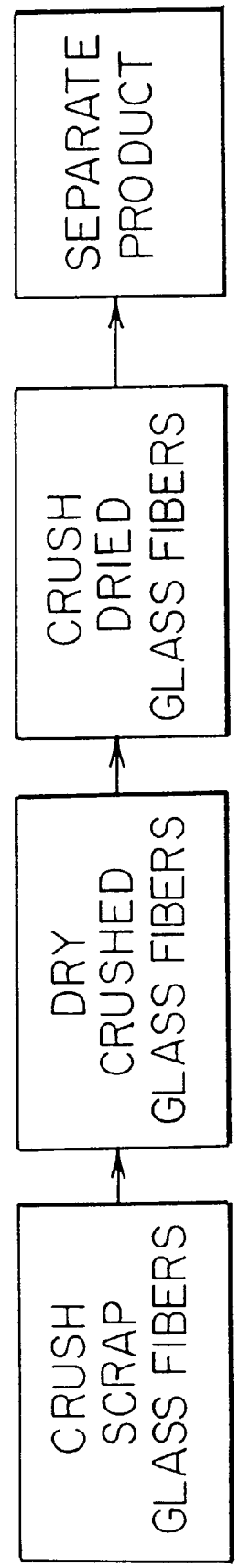
FIG. 12 is a flow diagram of a preferred process for producing glass fiber product from scrap glass fibers, in accordance with the present invention.

With reference to FIG. 12, the process generally comprises the initial step of supplying scrap glass fibers 16 to a first crusher 150, discussed in detail above, for crushing the scrap glass fibers 16 in the waste material 15 to form crushed glass fibers 152. Less than about 0.1 weight percent of a lubricant can be applied to the waste material 15 prior to passage through the dryer 130. If desired, a metal detector and removal device can be used to remove metallic materials and graphite.

The waste material 15 is dried by a dryer 130 to form dried waste material 154 having a mean average moisture content of less than about one weight percent, and preferably about 0.3 to about 0.5 weight percent moisture on a total weight basis.

The dried waste material 154 is preferably crushed by the second crusher 151 such that the secondary crushed glass fibers 155 therein have a mean average dimension 157, such as width or length, of less than about 5 millimeters (about 3/16 inches), and preferably between about 0.0008 and about 0.003 millimeters (about 1/32 to about 1/8 inches).

The first portion 188 of crushed glass fibers can be separated in an air separating device 202, 500 to separate a portion of crushed glass fibers 240 having a mean average length of less than about 5 millimeters (about 3/16 inches) from a second portion of oversize glass fibers and other waste material. This portion can be recycled as a batch melt ingredient in a glass melter or as reinforcement for a composite, as discussed in detail above.

In another aspect of the present invention, the application of a coating composition to generally continuous fibers can be controlled by supplying generally continuous fibers; applying a coating composition to the fibers with an applicator; and controlling application of the coating composition to fibers by extending a fiber displacing device comprising a retractable member positioned adjacent to and above the applicator such that the retractable member contacts and displaces the fibers to be spaced apart from the applicator to inhibit application of the coating composition to the fibers by the applicator. The retractable member can be retracted to a retracted position in which the fibers are adjacent the applicator for permitting application of the coating composition to the fibers.

The operation of the system 10 to perform the process according to the present invention will now be described. However, other systems than that shown and described herein could be used to perform the process of the present invention, if desired.

In the initial sequence of operation of the preferred embodiment, waste material 15 is gathered as discussed above and supplied to a crusher 150 such as is discussed above. The waste material including scrap glass fibers is crushed to form crushed glass fibers. Less than about 0.1 weight percent of a lubricant can be applied by spraying the waste material 15 prior to passage through the dryer 130. If desired, a metal detector and removal device can be used to remove metallic materials and graphite.

The dryer is activated to dry the waste material 15 to a mean average moisture content of less than about one weight percent, and preferably about 0.3 to about 0.5 weight percent moisture on a total weight basis.

The second crusher can be activated, if necessary, to crush the dried glass fibers to form secondary crushed glass fibers 155 having a mean average dimension 157, such as width or length, of less than about 5 millimeters (about 3/16 inches), and preferably between about 0.0008 and about 0.003 millimeters (about 1/32 to about 1/8 inches).

Air and the dried glass fibers are fed into an air separating device 202, 500 to separate a portion of crushed glass fibers 240 having a mean average length of less than about 5 millimeters (about 3/16 inches) from a second portion of oversize glass fibers and other waste material. This portion can be recycled as a batch melt ingredient in a glass melter or as reinforcement for a composite, as discussed in detail above.

From the foregoing description, it can be seen that the present invention provides a simple, economical, durable system and process for reducing waste disposal costs and increases efficiency and productivity. The resulting glass fiber product can have relatively smooth ends, low surface organic levels and can be readily pneumatically transported to facilitate recycling of the product to the glass melter. The systems and process of the present invention also provide the capability to consolidate waste from different glass fiber forming facilities.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. A system for producing glass fiber product from scrap glass fibers, the system comprising:

(a) a waste material supply comprising waste material produced by a glass fiberizing process and comprising scrap glass fibers which have no more than about 1 weight percent of a coating composition;

(b) a first crusher positioned to receive scrap glass fibers from the waste material supply, the first crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form crushed glass fibers;

(c) a dryer positioned to receive the crushed glass fibers from the first crusher, the dryer for drying the crushed glass fibers to form dried glass fibers having a mean average moisture content of less than about one weight percent;

(d) a second crusher positioned to receive dried glass fibers from the dryer, the second crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form secondary crushed glass fibers; and (e) a separating device positioned to receive the secondary crushed glass fibers from the second crusher, the separating device for separating the secondary crushed glass fibers into (1) a first portion of secondary crushed glass fibers having a mean average length of less than about 5 millimeters and (2) oversize dried waste material.

2. The system according to claim 1, wherein the mean average length of the scrap glass fibers of the waste material ranges from about 0.05 to about 0.3 meters.

3. The system according to claim 1, wherein the scrap glass fibers are free of a coating composition.

4. The system according to claim 1, wherein the first crusher of the system is a pull roll device.

5. The system according to claim 1, wherein the rollers of a rusher selected from the group consisting of the first crusher and the second rusher are formed from a material selected from the group consisting of hermoplastic materials and thermosetting materials.

6. The system according to claim 1, wherein at least one rotuberance of a roller is a corrugation having an axis which is generally parallel to an axis of rotation of the roller, the corrugation having generally rounded edges.

7. The system according to claim 1, wherein a crusher selected from the group consisting of the first crusher and the second crusher comprises a plurality of pairs of rollers.

8. The system according to claim 1, wherein each of the rollers has an axis of rotation, the axes of rotation of each pair of rollers being generally parallel and horizontally aligned.

9. The system according to claim 1, wherein each of the rollers has an axis of rotation, the axes of rotation of each pair of rollers being parallel and vertically offset.

10. The system according to claim 1, wherein the separating device is selected from the group consisting of screening devices, mills and air classifiers.

11. The system according to claim 10, wherein the air separating device is an uplift air separator.

12. The system according to claim 11, wherein the air separating device separates the glass fibers using air at a velocity ranging from about 0.6 to about 60 meters per second.

13. The system according to claim 1, wherein the waste material supply further comprises a fiber displacing device positioned adjacent to and above an applicator for inhibiting application of a coating composition by the applicator to the scrap glass fibers.

14. The system according to claim 1, further comprising a lubricant applicator positioned between the first crusher and the dryer for lubricating the waste material prior to drying thereof.

15. The system according to claim 1, further comprising a conveyor positioned between any of components (a) through (f) of claim 1 for conveying the waste material through the system.

16. The system according to claim 1, further comprising a metal removal device positioned between the first crusher and the dryer for removing metallic material from the crushed glass fibers.

17. The system according to claim 1, further comprising a coarse waste material separating device positioned between the first crusher and the dryer for receiving the crushed glass fibers from the first crusher and separating crushed glass fibers having a length greater than about 0.025 meters from oversize waste material.

18. The system according to claim 1, further comprising a cooling device positioned between the dryer and the second crusher for cooling the dried waste material received from the dryer.

19. The system according to claim 1, further comprising a glass melter for receiving the first portion of secondary crushed glass fibers from the separating device and melting the first portion of secondary crushed glass fibers.

20. The system according to claim 19, further comprising a feeder positioned between the separating device and the glass melter for feeding the first portion of secondary crushed glass fibers into the glass melter.

21. The system according to claim 20, further comprising a mixer positioned between the separating device and the feeder for mixing the first portion of secondary crushed glass fibers with glass batch material.

22. The system according to claim 1, wherein the system further comprises an applicator positioned to receive the first portion of crushed glass fibers from the separating device, the applicator for applying a coating to at least a portion of the first portion of crushed glass fibers to form coated glass fibers.

23. The system according to claim 22, wherein the system further comprises a second dryer positioned to receive the coated glass fibers from the applicator, the second dryer for drying at least a portion of the coating applied to the coated glass fibers.

24. The system according to claim 23, wherein the system further comprises a second separating device positioned to receive the coated glass fibers from a component of the system selected from the group consisting of the applicator and the second dryer, the second separating device for separating the coated glass fibers into a portion having a mean average length of less than about 5 millimeters and a second portion of agglomerated coated glass fibers.

25. A system for producing glass fiber product from scrap glass fibers, the system comprising:
   (a) a waste material supply comprising waste material produced by a glass fiberizing process and comprising scrap glass fibers which have no more than about 1 weight percent of a coating composition;
   (b) a crusher positioned to receive scrap glass fibers from the waste material supply, the crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing scrap glass fibers passing therebetween to form crushed glass fibers;
   (c) a dryer positioned to receive the crushed glass fibers from the crusher, the dryer for drying the crushed glass fibers to form dried glass fibers having a mean average moisture content of less than about one weight percent; and
   (d) a separating device positioned to receive the dried glass fibers from the dryer, the separating device for separating the dried glass fibers into (1) a first portion of dried glass fibers having a mean average length of less than about 5 millimeters and (2) oversize dried waste material.

26. A system for producing glass fiber product from scrap glass fibers, the system comprising:
   (a) a waste material supply comprising waste material produced by a glass fiberizing process and comprising scrap glass fibers which have no more than about 1 weight percent of a coating composition;
   (b) a dryer positioned to receive the waste material from the waste material supply, the dryer for drying the scrap glass fibers to form dried glass fibers having a mean average moisture content of less than about one weight percent;
   (c) a crusher positioned to receive dried glass fibers from the dryer, the crusher comprising at least one pair of rotatable, intermeshing rollers and a drive device for rotating at least one of the rollers such that each pair of rollers rotate at essentially the same speed, each roller having an outer surface comprising a plurality of protuberances, at least a portion of one protuberance of a first roller of the pair of rollers contacting a corresponding portion of at least one protuberance of a second roller of the pair of rollers for crushing dried glass fibers passing therebetween to form crushed glass fibers; and
   (d) a separating device positioned to receive the crushed glass fibers from the crusher, the separating device for separating the crushed glass fibers into (1) a first portion of crushed glass fibers having a mean average length of less than about 5 millimeters and (2) oversize dried waste material.

* * * * *